United States Patent
Guo et al.

(10) Patent No.: US 10,430,391 B2
(45) Date of Patent: Oct. 1, 2019

(54) TECHNIQUES FOR ACTIVITY TRACKING, DATA CLASSIFICATION, AND IN DATABASE ARCHIVING

(71) Applicant: Oracle International Corporation, Redwood Shores, CA (US)

(72) Inventors: Liang Guo, San Jose, CA (US); Vivekanandhan Raja, San Mateo, CA (US); Amit Ganesh, San Jose, CA (US); Joshua Gould, San Carlos, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 753 days.

(21) Appl. No.: 13/750,873

(22) Filed: Jan. 25, 2013

(65) Prior Publication Data

US 2014/0095547 A1     Apr. 3, 2014

Related U.S. Application Data

(60) Provisional application No. 61/707,685, filed on Sep. 28, 2012.

(51) Int. Cl.
*G06F 17/30* (2006.01)
*G06F 16/185* (2019.01)
(Continued)

(52) U.S. Cl.
CPC .......... *G06F 16/185* (2019.01); *G06F 3/0649* (2013.01); *G06F 16/113* (2019.01);
(Continued)

(58) Field of Classification Search
CPC ...... G06F 3/0649; G06F 16/185; G06F 16/21; G06F 16/27; G06F 16/217; G06F 16/22; G06F 16/113
See application file for complete search history.

(56) References Cited

U.S. PATENT DOCUMENTS 5,680,573 A    10/1997  Rubin
5,933,838 A *   8/1999  Lomet ................ G06F 11/1471
(Continued)

FOREIGN PATENT DOCUMENTS

WO    WO 01/82118 A2    11/2001

OTHER PUBLICATIONS

Lambert, Bob, "DMBI Tech Tip: Include Audit Columns on all Tables Cap Tech Consulting", dated Jan. 12, 2011, 2 pages.
(Continued)

*Primary Examiner* — Tyler J Torgrimson
(74) *Attorney, Agent, or Firm* — Hickman Palermo Becker Bingham LLP

(57) ABSTRACT

Techniques for activity tracking, data classification, and in-database archiving are described. Activity tracking refers to techniques that collect statistics related to user access patterns, such as the frequency or recency with which users access particular database elements. The statistics gathered through activity tracking can be supplied to data classification techniques to automatically classify the database elements or to assist users with manually classifying the database elements. Then, once the database elements have been classified, in-database archiving techniques can be employed to move database elements to different storage tiers based on the classifications. However, although the techniques related to activity tracking, data classification, and in-database archiving may be used together as described above; each technique may also be practiced separately.

18 Claims, 8 Drawing Sheets

(51) Int. Cl.
  *G06F 3/06* (2006.01)
  *G06F 16/21* (2019.01)
  *G06F 16/22* (2019.01)
  *G06F 16/27* (2019.01)
  *G06F 16/11* (2019.01)

(52) U.S. Cl.
  CPC ............ *G06F 16/21* (2019.01); *G06F 16/217* (2019.01); *G06F 16/22* (2019.01); *G06F 16/27* (2019.01)

(56) References Cited

U.S. PATENT DOCUMENTS

| | | | |
|---|---|---|---|
| 7,251,669 B1* | 7/2007 | Arora | G06F 17/30356 707/695 |
| 7,328,192 B1 | 2/2008 | Stengard et al. | |
| 8,316,051 B1 | 11/2012 | Burns | |
| 8,346,747 B2 | 1/2013 | Liu et al. | |
| 8,547,379 B2 | 10/2013 | Pacheco | |
| 8,688,654 B2 | 4/2014 | Groseclose | |
| 8,994,755 B2 | 3/2015 | Robinson | |
| 2003/0055807 A1* | 3/2003 | Lomet | 707/1 |
| 2003/0101133 A1 | 5/2003 | DeFrancesco | |
| 2003/0105732 A1* | 6/2003 | Kagalwala | G06F 17/30292 |
| 2003/0236781 A1 | 12/2003 | Lei | |
| 2004/0098383 A1 | 5/2004 | Tabellion et al. | |
| 2004/0117407 A1 | 6/2004 | Kumar et al. | |
| 2005/0027749 A1 | 2/2005 | Ohno | |
| 2005/0149584 A1* | 7/2005 | Bourbonnais et al. | 707/204 |
| 2005/0256897 A1 | 11/2005 | Sinha | |
| 2006/0085485 A1* | 4/2006 | Shimshoni | G06F 17/30368 |
| 2006/0101052 A1 | 5/2006 | Netrakanti | |
| 2006/0218127 A1 | 9/2006 | Tate et al. | |
| 2007/0088912 A1 | 4/2007 | Mukherjee | |
| 2007/0156790 A1* | 7/2007 | Sun Hsu | G06F 17/30563 |
| 2007/0198552 A1 | 8/2007 | Farrand | |
| 2007/0208665 A1 | 9/2007 | Ohara | |
| 2008/0040505 A1 | 2/2008 | Britto et al. | |
| 2008/0098045 A1* | 4/2008 | Radhakrishnan et al. | 707/203 |
| 2008/0235183 A1 | 9/2008 | Draese et al. | |
| 2008/0250073 A1* | 10/2008 | Nori | G06F 17/30368 |
| 2008/0294697 A1* | 11/2008 | Andrasak et al. | 707/200 |
| 2009/0070382 A1 | 3/2009 | Agrawal et al. | |
| 2009/0177622 A1 | 7/2009 | Hu et al. | |
| 2009/0187544 A1 | 7/2009 | Hsu et al. | |
| 2009/0198729 A1 | 8/2009 | Gong | |
| 2010/0077168 A1* | 3/2010 | Arakawa | G06F 12/0223 711/165 |
| 2010/0274827 A1* | 10/2010 | Hix et al. | 707/813 |
| 2010/0287178 A1 | 11/2010 | Lambert | |
| 2011/0106863 A1 | 5/2011 | Mamidi | |
| 2011/0179066 A1 | 7/2011 | Cardno | |
| 2011/0282830 A1 | 11/2011 | Malige | |
| 2012/0011329 A1 | 1/2012 | Nonaka | |
| 2012/0030247 A1 | 2/2012 | Yambal et al. | |
| 2012/0042130 A1 | 2/2012 | Peapell | |
| 2012/0137059 A1 | 5/2012 | Yang et al. | |
| 2012/0137061 A1 | 5/2012 | Yang | |
| 2012/0144098 A1 | 6/2012 | Yang | |
| 2012/0144099 A1 | 6/2012 | Yang | |
| 2012/0173477 A1 | 7/2012 | Coutts | |
| 2012/0185648 A1 | 7/2012 | Benhase | |
| 2012/0233129 A1 | 9/2012 | Brinkmoeller | |
| 2012/0260040 A1 | 10/2012 | Mallge | |
| 2013/0155118 A1 | 6/2013 | Robinson | |
| 2013/0169666 A1 | 7/2013 | Pacheco | |
| 2013/0169966 A1 | 7/2013 | Pacheco | |
| 2013/0325326 A1 | 12/2013 | Blumenberg | |
| 2014/0033120 A1 | 1/2014 | Bental | |
| 2014/0095438 A1 | 4/2014 | Marwah et al. | |
| 2014/0095442 A1 | 4/2014 | Guo et al. | |
| 2014/0095448 A1 | 4/2014 | Marwah et al. | |
| 2014/0095449 A1 | 4/2014 | Marwah et al. | |
| 2014/0095450 A1 | 4/2014 | Marwah et al. | |
| 2014/0122778 A1 | 5/2014 | O'Brien | |
| 2014/0244623 A1 | 8/2014 | King | |
| 2015/0170382 A1 | 6/2015 | Bhatia | |

OTHER PUBLICATIONS

Lambert, Bob, "DMBI Tech Tip: Include Audit Columns on all Tables", CapTech Venrures, dated Jan. 12, 2011, 2 pages.
Ahmed et al., "Lifecycle Management of Relational Records for External Auditing and Regulatory Compliance", IEEE, dated 2011.
U.S. Appl. No. 13/826,075, filed Mar. 14, 2013, Interview Summary, dated Nov. 18, 2015.
U.S. Appl. No. 13/804,581, filed Mar. 14, 2013, Interview Summary, dated Nov. 16, 2015.
U.S. Appl. No. 13/804,581, filed Mar. 14, 2013, Office Action, dated Nov. 19, 2015.
U.S. Appl. No. 13/804,394, filed Mar. 14, 2013, Interview Summary, dated Nov. 16, 2015.
U.S. Appl. No. 13/750,865, filed Jan. 25, 2013, Final Office Action, dated Nov. 4, 2015.
U.S. Appl. No. 13/826,075, filed Mar. 14, 2013, Office Action, dated Aug. 13, 2015.
Chi, Ed Huai-Hsin, "A Framework for Information Visualization Spreadsheets", PhD diss., University of Minnesota, dated 1999, 160 pages.
Chi et al., "Principles for Information Visualization Spreadsheets", IEEE, Computer Graphics and Applications 4, dated 1998, 9 pages.
U.S. Appl. No. 13/826,075, filed Mar. 14, 2013, Final Office Action, dated Feb. 2, 2015.
U.S. Appl. No. 13/804,394, filed Mar. 14, 2013, Final Office Action, dated Feb. 10, 2016.
U.S. Appl. No. 13/826,075, filed Mar. 14, 2013, Office Action, dated Feb. 26, 2016.
Verma et al., "An Architecture for Lifecycle Management in Very Large File Systems", Mass Storage Systems and Technologies, dated 2005, IEEE, 9 pages.
Chen et al., "Information Valuation for Information Lifecycle Management", Autonomic Computing, dated 2005, 12 pages.
U.S. Appl. No. 13/826,075, filed Mar. 14, 2013, Advisory Action, dated May 13, 2015.
U.S. Appl. No. 13/750,865, filed Jan. 25, 2013, Office Action, dated Mar. 23, 2015.
U.S. Appl. No. 13/804,581, filed Mar. 14, 2013, Final Office Action, dated Jun. 17, 2015.
U.S. Appl. No. 13/804,394, filed Mar. 14, 2013, Office Action, dated Jun. 22, 2015.
U.S. Appl. No. 13/804,884, filed Mar. 14, 2013, Office Action, dated Dec. 18, 2015.
U.S. Appl. No. 13/826,075, filed Mar. 14, 2013, Final Office Action, dated Jul. 5, 2016.
U.S. Appl. No. 13/804,884, filed Mar. 14, 2013, Advisory Action, dated Jun. 29, 2016.
Marwah, U.S. Appl. No. 13/804,394, filed Mar. 14, 2013, Final Office Action, dated Feb. 26, 2018.
Marwah, U.S. Appl. No. 13/826,075, filed Mar. 14, 2013, Interview Summary, dated Jul. 17, 2017.
Marwah, U.S. Appl. No. 13/826,075, filed Mar. 14, 2013, Final Office Action, dated May 10, 2017.
Marwah, U.S. Appl. No. 13/804,581, filed Mar. 14, 2013, Office Action, dated May 19, 2017.
Marwah, U.S. Appl. No. 13/804,394, filed Mar. 14, 2013, Office Action, dated May 11, 2017.
Guo, U.S. Appl. No. 13/750,865, filed Jan. 25, 2013, Office Action, dated Jun. 23, 2017.
Marwah, U.S. Appl. No. 13/804,884, filed Mar. 14, 2013, Advisory Action, dated Jul. 5, 2018.
Guo, U.S. Appl. No. 13/750,865, filed Jan. 25, 2013, Notice of Allowance, dated Aug. 10, 2018.
Marwah, U.S. Appl. No. 13/826,075, filed Mar. 14, 2013, Office Action, dated Dec. 5, 2016.
Marwah, U.S. Appl. No. 13/804,394, filed Mar. 14, 2013, Office Action, dated Jun. 1, 2018.

(56) References Cited

OTHER PUBLICATIONS

Marwah, U.S. Appl. No. 13/804,394, filed Mar. 14, 2013, Advisory Action, dated May 10, 2018.
Ren et al., "A New Buffer Cache Design Exploiting Both Temporal and Content Localities", IEEE, dated 2010, 11 pages.
U.S. Appl. No. 13/804,884, filed Mar. 14, 2013, Final Office Action, dated Apr. 28, 2016.
Marwah, U.S. Appl. No. 13/804,884, filed Mar. 14, 2013, Office Action, dated Sep. 19, 2018.
Marwah, U.S. Appl. No. 13/804,394, filed Mar. 14, 2013, Final Office Action, dated Dec. 5, 2018.
Marwah, U.S. Appl. No. 13/804,884, filed Mar. 14, 2013, Interview Summary, dated Dec. 18, 2018.
Marwah, U.S. Appl. No. 13/804,581, filed Mar. 14, 2013, Notice of Allowance, dated Jan. 24, 2019.

* cited by examiner

FIG. 3

102 Table

| | | | | | |
|---|---|---|---|---|---|
| 103 | Al | San Jose | CA | 3/12/2012 | 2/25/2012 | 1/22/2012 |
| 104 | Bob | San Jose | CA | 12/3/2012 | 5/5/2010 | 1/1/2009 |
| 105 | Cat | Redmond | WA | 2/23/2010 | 2/23/2010 | 12/22/2009 |
| 106 | Deb | Fremont | CA | 1/22/2012 | 1/22/2012 | 5/6/2011 |
| 107 | Hal | Redmond | WA | 2/3/2012 | 1/29/2012 | 11/22/2010 |
| 108 | Matt | Portland | OR | 5/3/2010 | 4/2/2010 | 3/2/2010 |
| 109 | Rob | San Jose | CA | 12/2/2011 | 6/3/2010 | 3/3/2010 |
| 110 | Sal | Bellevue | WA | 12/9/2010 | 12/8/2010 | 4/1/2008 |
| 111 | Val | Oakland | CA | 2/25/2012 | 2/25/2012 | 2/2/2011 |
| | 112 | 113 | 114 | 300 | 301 | 302 |

FIG. 7

102 Table

| | | | |
|---|---|---|---|
| Al | San Jose | CA | Active |
| Bob | San Jose | CA | Dormant |
| Cat | Redmond | WA | Archived |
| Deb | Fremont | CA | Active |
| Hal | Redmond | WA | Active |
| Matt | Portland | OR | Archived |
| Rob | San Jose | CA | Dormant |
| Sal | Bellevue | WA | Archived |
| Val | Oakland | CA | Active |

103, 104, 105, 106, 107, 108, 109, 110, 111

112  113  114  700

TECHNIQUES FOR ACTIVITY TRACKING, DATA CLASSIFICATION, AND IN DATABASE ARCHIVING

CROSS REFERENCE TO RELATED APPLICATIONS AND CLAIM OF PRIORITY

The present application claims priority to Provisional U.S. Patent Application No. 61/707,685 filed Sep. 28, 2012, the entire contents of which is hereby incorporated by reference under 35 U.S.C. § 120 for all purposes as though fully stated herein.

FIELD OF THE INVENTION

The techniques presented herein are directed towards activity tracking and database archiving.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Database Systems

A database management system ("DBMS") manages a database. A database comprises database data and metadata that are stored on a persistent memory mechanism, such as a set of hard disks. In a DBMS, data is stored in one or more data containers, each container contains records, and the data within each record is organized into one or more fields. In relational database systems, the data containers are referred to as tables, the records are referred to as rows, and the fields are referred to as columns. In object oriented databases, the data containers are referred to as object classes, the records are referred to as objects, and the fields are referred to as attributes. However, other database architectures may use other terminology.

The present invention is not limited to any particular type of data container or database architecture. However, for the purpose of explanation, the examples and the terminology used herein shall be that typically associated with relational databases. Thus, the terms "table", "row" and "column" shall be used herein to refer respectively to the data container, record, and field.

Database applications and clients interact, directly or indirectly, with the database by submitting database commands that cause the DBMS to perform operations on the data stored within the database. A database command may be in the form of a database statement that conforms to a database language. One example language for expressing database commands is the Structured Query Language (SQL). SQL data definition language ("DDL") instructions are issued to a DBMS to define database structures such as tables, views, or complex data types. For instance, CREATE, ALTER, DROP, and RENAME, are common examples of DDL instructions found in some SQL implementations. SQL data manipulation language ("DML") instructions are issued to a DBMS to manage data stored within a database structure. For instance, SELECT, INSERT, UPDATE, and DELETE are common examples of DML instructions found in some SQL implementations.

Although the examples described above are based on Oracle's SQL, the techniques provided herein are not limited to Oracle's SQL, to any proprietary form of SQL, to any standardized version or form of SQL (ANSI standard), or to any particular form of database command or database language. Furthermore, for the purpose of simplifying the explanations contained herein, database commands or other forms of computer instructions may be described as performing an action, such as creating tables, modifying data, and setting session parameters. However, it should be understood that the command itself performs no actions, but rather the DBMS, upon executing the command, performs the corresponding actions. Thus, such statements as used herein, are intended to be shorthand for commands, that when executed by the DBMS, cause the DBMS to perform the corresponding actions.

In most cases, a DBMS executes database commands as one or more transactions, sets of indivisible operations performed on a database. Thus, after executing a given transaction, the database is left in a state where all the transaction's operations have been performed or none of the transaction's operations have been performed. While implementations may differ, most transactions are performed by, 1) beginning the transaction, 2) executing one or more data manipulations or queries, 3) committing the transaction if no errors occurred during execution, and 4) rolling back the transaction if errors occurred during execution. Consequently, a DBMS may maintain logs keeping track of committed and/or uncommitted changes to the database. For example, in some implementations of SQL, executing database commands adds records to REDO and UNDO logs, which can be used to implement rollback, database recovery mechanisms, and features such as flashback queries.

Database Archiving

Data is generated and stored at ever increasing rates in organizations both governmental and corporate. While some business data almost never loses its value, the usefulness of most data tends to decline over time until it has no further value for almost any purpose. Generally, the value of business information tends to be the greatest soon after the data is created and remains active for only a short period of time, at most a few years, after which the data's importance to the business, and thus the data's general usage, begins to decline. However, many businesses are constrained by factors, such as legal mandates, requiring data to be retained long after the data's usefulness has expired.

As a result, it has been commonly observed that users access at times as little as 10%-20% of the data stored within a database. The other 80-90% of data is rarely, if ever, accessed by users and yet contributes to the bulk of the storage costs required to maintain the database. To make matters worse, as the volume of data stored by the database increases, performance becomes degraded due to slower full table scans and elongated application upgrades.

Thus, faced with rising storage costs and deteriorating system performance, businesses have sought ways to efficiently manage their database's inactive data. At present, many businesses try to achieve this goal by resorting to third party archiving solutions that offload inactive data out of the database and into archival storage. While this solution helps to ameliorate the effects of accelerated data production, businesses employing third party archiving solutions tend to replace one problem with a host of others.

As one issue, third party archiving solutions tend to lack intimate knowledge of the format and contents of the database. For instance, many third party archiving solutions only work at the level of the file system and therefore can only archive at the granularity of a file. Thus, while a third party archiving solution may be able to offload the individual files that make up the database, the third party archiving solution may not be able to selectively offload individual database elements. Furthermore, the third party archiving solution may detect inactive data based on file level metrics, such as the frequency or recency with which files are accessed, but may be unable to detect inactivity at the granularity of an individual database element. Consequently, when a database file contains both active and inactive data, third party archiving solutions may be unable to identify and archive only the inactive data. This issue can be exacerbated by database implementations that store data as flat files, where an entire table, or even the entire database, may be contained within a single large file on the file system.

As another issue, data that has been offloaded out of the database is typically inaccessible to the DBMS. Consequently, archived data needs to be reloaded back into the database before the DBMS can service commands to query or manipulate the archived data. Additionally, in some cases, the online schema of the database may have changed since the archived data was offloaded, thus requiring the additional overhead of propagating those changes to the archived data before reintegration into the database. As a result, third party archiving solutions typically do not allow users to seamlessly access archived data when needed.

BRIEF DESCRIPTION OF THE DRAWINGS

The present invention is illustrated by way of example, and not by way of limitation, in the figures of the accompanied drawings and in which like reference numerals refer to similar elements and in which:

FIG. 3 illustrates a table after activity tracking has been enabled according to an embodiment.

FIG. 7 illustrates a table after in-database archiving has been enabled according to an embodiment.

DETAILED DESCRIPTION

Figure 1:
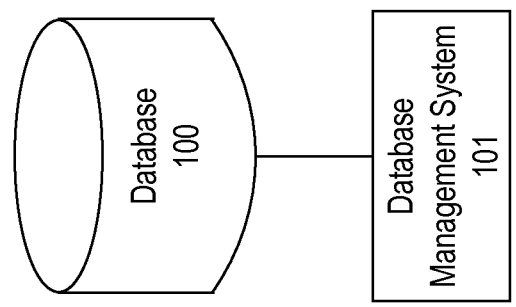
FIG. 1 is a block diagram illustrating an operating environment upon which an embodiment of the present invention may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
    1.0 General Overview
    2.0 Operating Environment
    3.0 Activity Tracking
    3.1 Enabling and Disabling Activity Tracking
    3.2 Uses of Activity Tracking
    3.3 Real-Time Row-Level Activity Tracking
    3.4 Batched Row-Level Activity Tracking
    3.5 Metadata Row-Level Activity Tracking
    3.6 Object-Level Activity Tracking
    4.0 Data Classification
    4.1 Data Classification Storage
    4.2 Automatic Data Classification
    4.3 Manual Data Classification
    4.4 Row-Level Visibility Control
    5.0 In-Database Archiving
    6.0 Hardware Overview 1.0 General Overview In an embodiment, rather than relying on third party archiving solutions, the DBMS supports techniques to identify and archive inactive data. Conceptually, many of the techniques described herein can be divided into three categories, activity tracking, data classification, and in-database archiving. Activity tracking refers to techniques that collect statistics related to user access patterns, such as the frequency or recency with which users access particular database elements. The statistics gathered through activity tracking can be supplied to data classification techniques to automatically classify the database elements or to assist users with manually classifying the database elements. Then, once the database elements have been classified, in-database archiving techniques can be employed to move database elements to different storage tiers based on the classifications. However, although the techniques related to activity tracking, data classification, and in-database archiving may be used together as described above, each technique may also be practiced separately. For example, the statistics gathered through activity tracking may be used for a variety of purposes other than database archiving.

In an embodiment, a DBMS adds one or more activity columns to a database table, where each of the one or more activity columns is associated with a particular activity of a set of activities. In response to receiving a database command that accesses one or more rows of the database table, the DBMS determines one or more activities that the database command performs. The DBMS updates an activity column of the one or more activity columns with activity information for each of the one or more rows, where the activity column is associated with at least one activity of the one or more activities.

In an embodiment, a DBMS in response to receiving a database command accessing one or more database elements of a database, determines one or more activities that the database command performs. The DBMS marks the one or more database elements in one or more bitmaps corresponding to the one or more activities. In response to a determination that a specified period of time has elapsed, the DBMS adds the one or more bitmaps to a bitmap log.

In an embodiment, a DBMS associates each of a plurality of lifecycle state values with a different storage tier of a plurality of storage tiers. The DBMS adds a lifecycle state column to one or more rows of a database table, wherein the lifecycle state column specifies a lifecycle state value for each of the one or more rows. The DBMS receives a command that updates the lifecycle state column with a particular lifecycle state value for a particular row. The DBMS moves the particular row to the storage tier associated with the particular lifecycle state.

In other embodiments, the invention encompasses a computer apparatus and a computer-readable medium configured to carry out the foregoing steps.

2.0 Operating Environment

FIG. 1 is a block diagram illustrating an operating environment upon which an embodiment of the present invention may be implemented. Techniques described herein may be implemented on DBMS 101 to facilitate managed storage of data on database 100, such as table 102. Table 102 consists of a plurality of records corresponding to rows 103-111. Each row in table 102 has a plurality of fields, corresponding to columns 112-114 including fields for name (column 112), city of residence (column 113), and state of residence (column 114). Although not depicted in FIG. 1, database 100 may in fact contain many other database tables, database objects, data, and metadata that can be managed by DBMS 101. However, for the purpose of illustrating clear examples, the techniques described herein shall be explained primarily in reference to table 102.

In an embodiment, DBMS 101 is implemented on one or more computing devices that are communicatively coupled to database 100. An example of a computing device upon which DBMS 101 may be implemented is described below in the "Hardware Overview". DBMS 101 may be communicatively coupled to database 100 directly, such as by a computer bus, or indirectly over one or more local area networks (LANs) and/or wide area networks (WANs). In one embodiment, DBMS 101 is communicatively coupled to database 100 over the Internet.

In an embodiment, database 100 is implemented on one or more storage devices, such as an array of hard drive disks, random-access memory (RAM), tape drives, flash drives, optical drives, or combinations thereof. However, storage devices other than those listed above may also be used to implement database 100. In addition, although database 100 is depicted as a single entity within FIG. 1, database 100, in some embodiments, may be distributed across many different storage devices located at many different physical locations. In such embodiments, DBMS 101 may also be distributed over many different physical locations or in communication with other DBMSs not depicted within FIG. 1 in order to collectively manage database 100.

3.0 Activity Tracking

In an embodiment, DBMS 101 employs techniques that collect metrics related to how users access the various elements of database 100. To simplify the following explanations, these techniques will be referred to collectively as "activity tracking". In some cases, DBMS 101 performs activity tracking at row-level granularity. For example, DBMS 101 may maintain timestamps indicating the last time a particular activity (such as a read or write) was performed on each row. In other cases, DBMS 101 performs activity tracking at object-level granularity. For example, DBMS 101 may maintain metrics indicating the frequency or recency with which users access database objects, such as tables, views, and indexes. In the following sections pertaining to activity tracking, techniques will be described that relate to activity tracking in general as well as techniques specific to row-level and object-level activity tracking.

3.1 Uses of Activity Tracking

As will be described in greater detail in later sections, activity tracking can be used to help identify inactive data for manual or automatic archival. However, data archival is not the only purpose to which the metrics collected through activity tracking may be employed. For example, database features such as optimistic locking require the ability to determine, during a given transaction, whether a row has been modified by another user before the transaction commits. The techniques described herein, in some embodiments, allow the DBMS 101 to maintain timestamps indicating the last time a row has been updated. Thus, by inspecting the timestamps, DBMS 101 can determine whether another user has modified a row since the transaction began. As a result, although activity tracking is capable of being used concurrently with data archival, activity tracking can also be implemented as a separate and independent feature.

3.2 Enabling and Disabling Activity Tracking

In some embodiments, activity tracking is an optional feature that DBMS 101 can enable or disable as needed. As one example, DBMS 101 may support a database command that allows users to set metadata, such as a flag, that indicates whether activity tracking is enabled or disabled globally for database 100. As another example, DBMS 101 may support a database command that allows users to enable or disable activity tracking for a particular set of database objects (e.g. tables). Thus, DBMS 101 may maintain metadata, such as a flag for each database object or a list of object references, indicating the database objects for which activity tracking is currently enabled. For embodiments that implement both object-level and row-level activity tracking, the database command may allow the user to specify, for applicable database objects, which type(s) of activity tracking will be enabled. However, in alternative embodiments, DBMS 101 may support at least two different database commands, one that controls row-level activity tracking and another that controls object-level activity tracking.

In an embodiment, DBMS 101 disables activity tracking by default. Thus, unless explicitly activated by a user, DBMS 101 avoids the processing and storage overheads associated with activity tracking. However, in other embodiments, DBMS 101 enables activity tracking by default. Thus, unless explicitly deactivated by a user, DBMS 101 collects metrics related to activities performed on database 100.

3.3 Real-Time Row-Level Activity Tracking

In some cases, the applications and features that make use of the metrics collected by activity tracking require fine-grained and up-to-date indications of when activities have been performed on the rows 103-111 of database 100. As one example, the optimistic locking feature described above is time-sensitive. Should the DBMS 101 collect metrics indicating when a row has been updated at a course level of granularity or in a delayed manner there is a risk that a row may be updated by another user before the current transaction commits without the update being noticed by DBMS 101. Thus, in an embodiment, DBMS 101 stores the metrics in-line as part of table 102 and updates the metrics as the activities are performed in real time. For the purpose of convenience, the techniques described in this section will be referred to as "real-time row-level activity tracking".

As used herein, activity information comprises one or more metrics about a database element that indicate the frequency or recency of access of the database element, or combination thereof, over one or more periods of time. Access refers to, without limitation, reading, changing, or creating the database element. Examples of activity information include (1) a timestamp indicating when a row was inserted, last updated and/or last read, or a timestamp indicating when a table or portion thereof containing the row was accessed; and (2) a metric indicating the frequency of access to a row in the last week, in each of the two weeks, or the last month, last quarter, etc.

Figure 2:
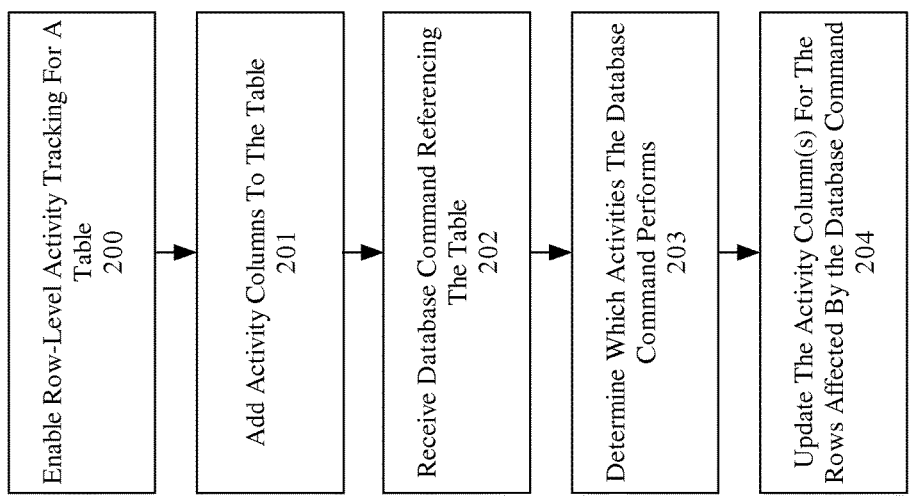
FIG. 2 is a flow diagram illustrating a DBMS performing real-time row-level activity tracking on a database table.

FIG. 2 is a flow diagram illustrating a DBMS performing real-time row-level activity tracking on a database table. In order to illustrate clear examples, it will be assumed that DBMS 101 follows the flow diagram depicted in FIG. 2 in order to perform real-time row-level activity tracking on table 102.

At block 200, DBMS 101 enables row-level activity tracking on table 102. In some embodiments, row-level activity tracking is enabled using any of the techniques mentioned above in "Enabling and Disabling Activity Tracking".

At block 201, DBMS 101 adds one or more activity columns to table 102. Each of the activity columns added by DBMS 101 represents a particular type of activity that may be performed on the rows 103-111 of table 102. For example the activities may include reads, writes, and/or creation of the rows. The activity columns are used by DBMS 101 to store metrics for each row related to the associated activity. In one embodiment, the activity columns are used to store timestamps indicating the last time the associated activity has been performed on each row. In other embodiments, the activity columns store frequency counts indicating the number of times the associated activity has been performed on each row. In still other embodiments, the activity columns store metrics related to both frequency and recency, such as the number of times the associated activity has been performed on each column during a particular period of time (e.g. the past day). In order to provide clear examples, FIG. 3 illustrates table 102 after activity tracking has been enabled according to an embodiment. In FIG. 3, DBMS 101 has added activity columns 300, 301, and 302 to table 102 representing the activities of reading a row, writing to a row, and creating a row respectively. Each activity column stores timestamps indicating the last time the associated activity was performed on each row. Thus, activity column 300 stores timestamps indicating the last time each row was read, activity column 301 stores timestamps indicating the last time each row was updated, and activity column 302 stores timestamps indicating when each row was added to table 102. In other embodiments, the activities tracked or the metrics maintained within the activity columns may differ from the embodiment depicted by FIG. 3. A timestamp is any data that denotes a particular time or time frame. Thus, in other embodiments, DBMS 101 may use formats other than calendar dates for timestamps, such as Coordinated Universal Time (UTC), or a level of granularity broader or finer than a calendar day.

In an embodiment, activity columns 300, 301, and 302 are added in response to activating row-level activity tracking for table 102. Thus, in response to enabling row-level activity tracking on table 102, DBMS 101 generates one or more DDL commands that add activity columns 300, 301, and 302 to table 102.

In an embodiment, activity columns 300, 301, and 302 are added to table 102 with default values. In one embodiment, the default values are NULL values. In other embodiments, DBMS 101 stores timestamps in each row of activity columns 300, 301, and 302 indicating the time when each activity column was added to table 102 by default.

In an embodiment, activity columns 300, 301, and 302 are system columns that are hidden from the users of database 100. For instance, the metrics collected through activity tracking may be relied upon by various database applications. In order to ensure that the database applications function properly, DBMS 101 takes measures to protect the accuracy and integrity of the metrics stored within activity columns 300, 301, and 302. In one embodiment, DBMS 101 prevents the users from directly referencing the activity columns in database statements. Thus, DBMS 101 in response to receiving a database command that references activity column 300, 301, or 302 may return an error or otherwise refuse to execute the database command. In other embodiments, DBMS 101 prevents database commands that would modify activity column 300, 301, or 302, but still allows database commands that passively read the activity columns. Using SQL as an example, a query in the form of a SELECT statement may be accepted by DBMS 101, whereas an UPDATE statement referencing activity column 300, 301, or 302 would be rejected. In still other embodiments, DBMS 101 may limit access to activity columns 300, 301, and 302 to users with special privileges, such as an administrator.

In an embodiment, DBMS 101 maintains a session level parameter that determines whether activity columns 300, 301, and 302 are visible to user queries. In addition, DBMS 101 supports a database command that allows users to set the session level parameter. When the parameter is set to visible, DBMS 101 includes activity columns 300, 301, and 302 in user queries. However, when the parameter is set to invisible, DBMS 101 omits activity columns 300, 301, and 302 from user queries. Thus, users of database 100 are able to control whether or not to view activity columns 300, 301, and 302 when querying database 100.

At block 202, DBMS 101 receives a DML command that references table 102. In one embodiment, the DML command is received from a user of database 100. However, in other embodiments, the DML command is generated automatically by DBMS 101. For example, DBMS 101 may generate the DML command as the result of a database trigger activating due to receiving or executing another database command. In some embodiments, in response to receiving the DML command, DBMS 101 checks metadata associated with table 102 to determine whether activity tracking has been enabled. If activity tracking is enabled, DBMS 101 proceeds to block 203. If activity tracking is disabled, DBMS 101 does not proceed to block 203, and instead executes the database command.

At block 203, DBMS 101 determines which activities are performed by the DML command received at block 202. Using SQL as an example, DBMS 101 may associate SELECT commands to activity column 300 (reads), UPDATE commands to activity column 301 (writes), and INSERT commands to activity column 302 (creation). However, in other embodiments, the same DML command may be associated with more than one activity column. For example, INSERT commands add a row to a table but also may cause the DBMS 101 to write to the row during the same statement execution. Thus, an embodiment may associate INSERT commands with both activity column 301 and activity column 302. As a result, depending on the embodiment, DML commands may be associated with activity columns in many different ways and combinations.

At block 204, DBMS 101 updates the activity columns 300, 301, and 302 associated with the activities determined at block 203. In an embodiment, DBMS 101 updates activity columns 300, 301, and 302 using a database trigger. Thus, DBMS 101 defines a database trigger that activates in response to receiving the DML command at block 202 and generates one or more additional DML commands that update the associated activity columns. In other embodiments, DBMS 101 updates the activity columns by rewriting the DML command received at block 202. For example, assuming that the DML command is an UPDATE command, DBMS 101 may rewrite the UPDATE command such that, when executed, the UPDATE command also writes a timestamp to the associated activity column. Examples of techniques for rewriting queries can be found in application Ser. No. 09/167,092, "Database Fine-Grained Access Control", naming Lei et al. as inventors, the entire contents of which is hereby incorporated by reference for all purposes as if fully stated herein. For embodiments that store frequency counts, as opposed to timestamps, updating the activity column may instead involve generating or rewriting DML commands to increment a counter within the appropriate activity columns 300, 301, and 302.

In some cases, the DML command received at block 202 will contain a query possessing a set of predicates, the set of predicates limiting application of the DML command to particular rows 103-111 of table 102. Using SQL as an example, the DML command may contain a WHERE clause. In an embodiment, DBMS 101 only updates the activity columns 300, 301, 302 for rows that meet the same query defined by the DML command. Thus, for embodiments that use database triggers, DBMS 101 when generating the additional one or more DML commands includes the same query found in the DML command received at block 202. For embodiments that update by rewriting the DML command received at block 202, the original query remains intact during the rewriting process. By limiting the activity column 300, 301, 302, updates to only those rows which meet the predicates submitted with the DML command received at block 202, DBMS 101 is able to track activities only for the intended targets of the DML command, as opposed to ancillary activities that may be performed during scanning, such as "reading" rows to evaluate the predicates.

One reason that DBMS 101 may choose to rewrite DML commands to perform the update to activity columns 300, 301, and 302, rather than relying on database triggers is to reduce the amount of overhead. As mentioned previously, when database commands are executed, many DBMSs will perform maintenance tasks such as generating REDO and UNDO logs in case the current transaction needs to be restarted or rolled back. By rewriting the DML command, rather than generating additional DML commands, DBMS 101 performs the activities related to the original database statement and the update to activity columns 300, 301, and 302 during the same statement execution. As a result, the maintenance tasks are performed fewer times, causing the DBMS 101 to incur less overhead to update activity columns 300, 301, and 302.

Furthermore, the update to activity columns 300, 301, and 302 will commit and roll back together with the activities performed by the DML command received at block 202. Thus, the metrics remain in sync with the activities. For features such as flashback queries, which rely on the REDO/UNDO logs to perform queries on previous states of database 100, such a property allows for accurate views into activity tracking metrics as they existed at previous points in time.

However, the efficiencies described above for preferring rewriting over database triggers to update activity columns 300, 301, and 302 may not hold true in all cases and are dependent upon the implementation-specific design details of DBMS 101.

Real-time row-level activity tracking allows for potentially a very fine level of granularity for the timestamps maintained within activity columns 300, 301, and 302. In particular, since activity columns 300, 301, and 302 are updated in response to each respective activity being performed on the rows 103-111 of table 102, the DBMS 101 is able to control the level of granularity at which metrics are collected by storing coarser or finer timestamps. For example, the DBMS 101 may store timestamps with a granularity in seconds, minutes, days, weeks, etc, depending on user requirements. In some embodiments, DBMS 101 maintains a parameter that controls the level of granularity and supports a database command that allows users to update that parameter. Thus, real-time row-level activity tracking allows DBMS 101 to supply fine-grained activity tracking for users that require accurate and up-to-date metrics.

3.4 Batched Row-Level Activity Tracking

However, in some embodiments, real-time row-level activity tracking may cause a significant amount of increased overhead, particularly for DML commands that passively read data without making any modifications. More specifically, when updating data, many DBMS implementations perform tasks associated with maintaining the consistency of the database that are not required when executing DML commands that only read data. However, when reads are tracked with real-time row-level activity tracking, each time a DML command is received that passively reads data, DBMS 101 responds by modifying table 102 to update the associated activity column. That modification, in effect, changes the basic semantics of read-only DML commands and creates the overhead of transaction processing.

In situations where the database applications or features of database 100 can tolerate metrics at a coarser level of granularity, some embodiments may instead employ a batching approach to alleviate the effects of the overhead described above. Thus, for the purpose of convenience, the techniques described in this section will be referred to as batched row-level activity tracking. In some embodiments, batched row-level activity tracking is performed for all activity columns. However, in other embodiments, batched row-level activity tracking is performed only for activity columns that track reads.

Figure 4:
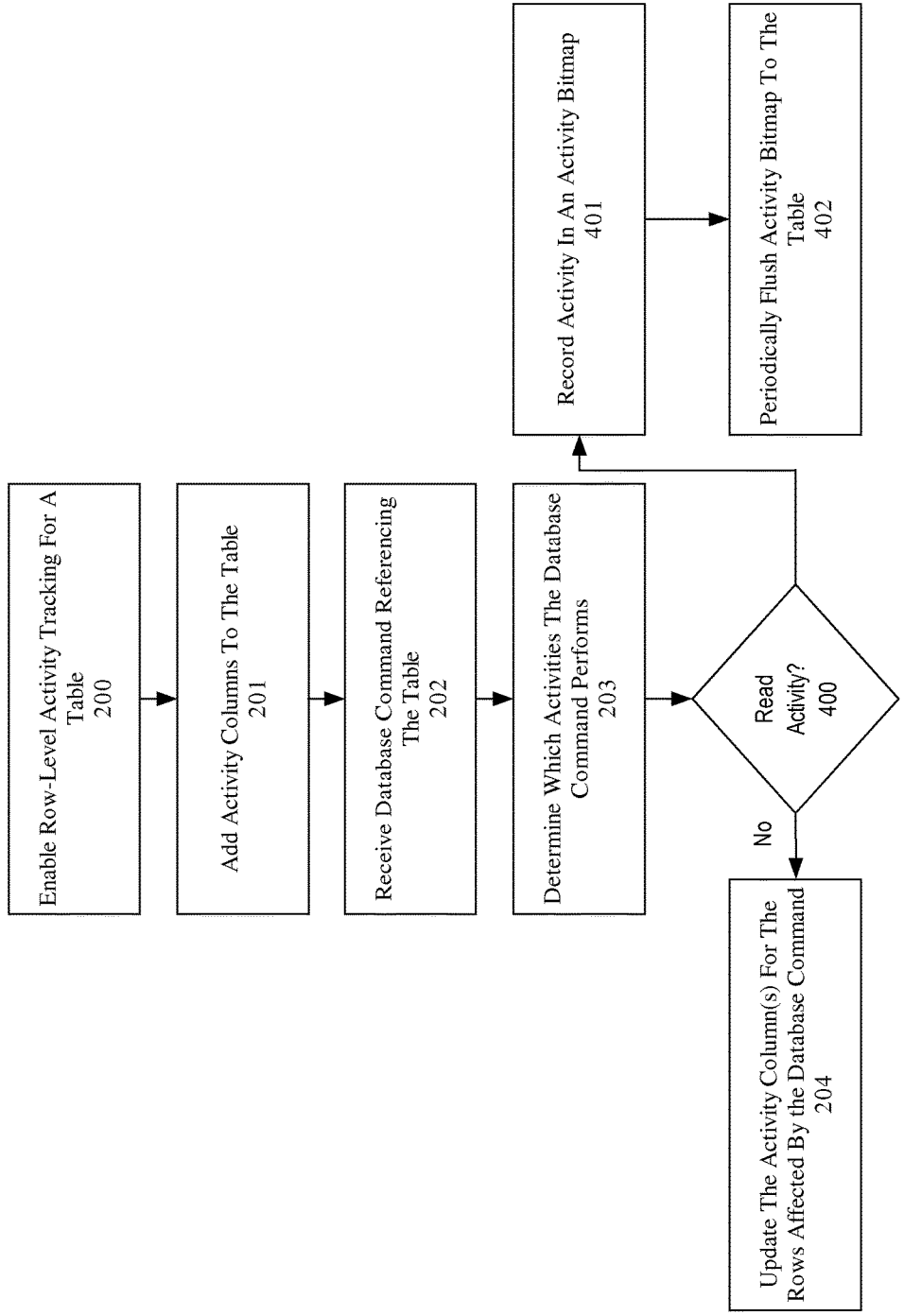
FIG. 4 is a flow diagram illustrating a DBMS performing batched row-level activity tracking for reads according to an embodiment.

FIG. 4 is a flow diagram illustrating a DBMS performing batched row-level activity tracking for reads according to an embodiment. As a result, FIG. 4 depicts a modification of the flow diagram illustrated by FIG. 2 that allows reads to be tracked using a batched approach and other activities, such as writes and creation, to be tracked in real-time. However, as mentioned above, other embodiments may instead perform batched row-level activity tracking for all activities, rather than only reads. Such embodiments may omit blocks 204 and 400, instead jumping directly from block 203 to block 401. In order to illustrate clear examples, it will be assumed that DBMS 101 follows the flow diagram depicted in FIG. 4 in order to perform activity tracking on table 102. In addition, the following explanations assume that the activity columns added at block 201 adhere to the embodiment depicted in FIG. 3.

Blocks 200, 201, 202, 203, and 204 are described above in "Real-time Row-level Activity Tracking" and, for the sake of brevity; a repeated discussion of those blocks will be omitted.

At block 400, DBMS 101 determines whether the database command received at block 202 has been determined at block 203 to perform a read. If the database command received at block 202 performs a read, DBMS 101 proceeds to block 401 to perform batched row-level activity tracking. However, if the database command received at block 202 does not perform a read, DBMS 101 proceeds to block 204 to perform real-time row-level activity tracking. In some cases, the database command received at block 202 may be mapped to multiple activity columns at block 203. As a result, DBMS 101 may traverse multiple paths, entering block 204 to update activity columns 301 or 302 and entering block 401 to update activity column 300.

At block 401, DBMS 101 records the rows 103-111 read by the database command received at block 203 in an activity bitmap. Similar to block 204, the database command received at block 203 may contain a query, such as a WHERE clause. Thus, in such cases, DBMS 101 performs the query to determine the rows affected by the database command, then marks those rows in the activity bitmap. For example, the individual bits of the activity bitmap may correspond to the individual rows 103-111 of the table 102, with the DBMS marking affected rows by flipping the corresponding bits. In some embodiments, the activity bitmap is stored in metadata external to the table 102. For embodiments that perform batched row-level activity tracking for more activities than reads, DBMS 101 may maintain multiple activity bitmaps corresponding to the various tracked activities.

At block 402, DBMS 101 periodically flushes the activity bitmap to table 102. In an embodiment, the activity bitmap marked at block 401 is associated with a particular period of time. In order to provide clear examples, it will be assumed that the particular period of time is a calendar day; however other embodiments can use different periods measuring in seconds, minutes, hours, years, or any other arbitrary period of time. Thus, at the end of each day (i.e. midnight) DBMS 101 generates one or more DML commands which update activity column 300 with timestamps indicating the previous day's date for rows marked in the bitmap and resets the bitmap to its initial state. As a result, the timestamps stored within activity column 300 represent the last day that each of rows 103-111 have been read. The update to activity column 300 therefore occurs in batches, rather than in response to receiving each DML command. Therefore, DBMS 101 can combine updates for multiple marked rows into fewer updating DML commands or perform the updates during downtime or maintenance periods which may be scheduled at the end of each day. In some embodiments, DBMS 101 supports a database command that allows users to set the particular period of time.

3.5 Metadata Row-Level Activity Tracking

In some embodiments, DBMS 101 maintains the activity tracking metrics solely as metadata, rather than within activity columns that are part of table 102. Depending on the implementation of DBMS 101, such embodiments may not be able to take advantage of certain features of DBMS 101, such as flashback queries, due to the lack of REDO/UNDO logs being generated as the metrics are updated. However, such embodiments may potentially experience less overhead since the table 102 does not need to be updated to store the metrics. For the purpose of convenience, the technique described in this section will be referred to as "metadata row-level activity tracking".

Figure 5:
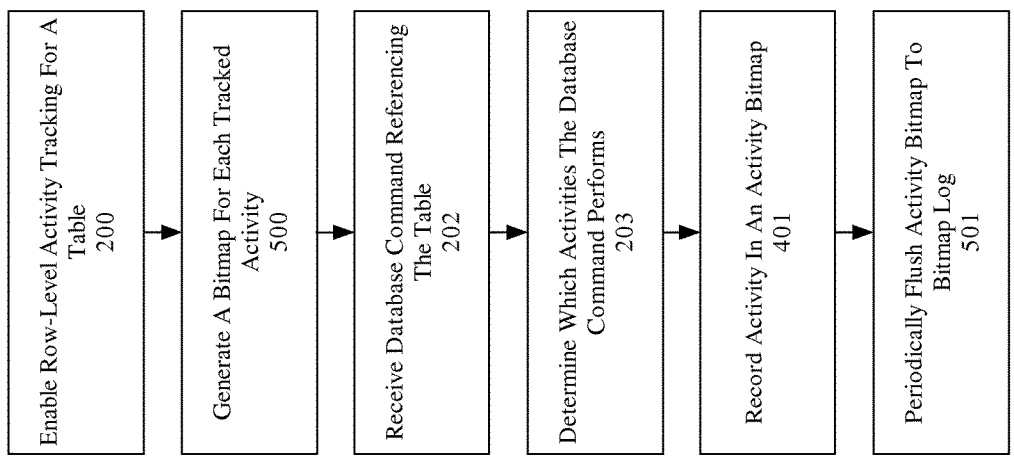
FIG. 5 is a flow diagram illustrating a DBMS performing metadata row-level activity tracking according to an embodiment.

FIG. 5 is a flow diagram illustrating a DBMS performing metadata row-level activity tracking according to an embodiment. In order to illustrate clear examples, it will be assumed that DBMS 101 follows the flow diagram depicted in FIG. 5 in order to perform activity tracking on table 102. In addition, FIG. 5 assumes that the metadata used to store the metrics takes the form of a bitmap. However, in other embodiments, mapping structures other than a bitmap may be used to keep track of the activities performed on rows 103-111.

In FIG. 5, the steps depicted in blocks 200, 202, 203, and 401 have already been described in previous sections and, for the sake of brevity, a repeated explanation will not be included. However, at block 203, rather than determining which activities the DML command received at block 202 performs by checking a map between DML commands and activity columns, DBMS 101 instead checks a map between DML commands and activity bitmaps.

At block 500, DBMS 101 generates an activity bitmap for each of the tracked activities and associates those activity bitmaps with table 102. Similar to block 201, in an embodiment DBMS 101 generates three activity bitmaps, an activity bitmap that tracks reads, an activity bitmap that tracks writes, and an activity bitmap that tracks time of creation.

At block 501, DBMS 101 periodically flushes the activity bitmaps to a bitmap log. In an embodiment, each of the activity bitmaps is associated with a particular period of time, such as a calendar day, although any arbitrary period of time may be used. At the end of each day, DBMS 101 appends the activity bitmaps to the bitmap log and resets the bitmaps to their initial state. As a result, the bitmap log contains entries indicating for each day which rows have been the subject of a particular activity. In order to determine metrics, DBMS 101 mines the bitmap log. For example, in order to determine which rows 103-111 have been the subject of a read in the past ten days, DBMS 101 may retrieve from the bitmap log the last ten activity bitmaps corresponding to reads. The ten activity bitmaps can then be added together by performing an OR operation, which results in a bitmap where each bit indicates whether the associated row has been read in the past ten days. In an embodiment, DBMS 101 supports a database command that allows users to query the bitmap log in order to discover metrics.

3.6 Object-Level Activity Tracking

In some embodiments, DBMS 101 performs activity tracking at object-level granularity. Thus, metrics are collected pertaining to activities performed on database objects, such as tables, views, and indexes.

Figure 6:
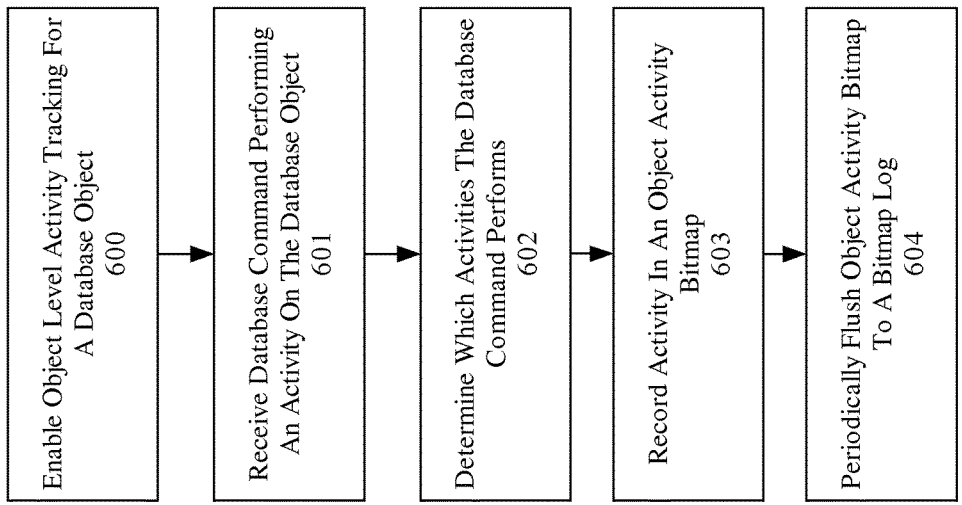
FIG. 6 is a flow diagram depicting a DBMS performing object-level activity tracking according to an embodiment.

FIG. 6 is a flow diagram depicting a DBMS performing object-level activity tracking according to an embodiment. In order to provide clear examples, it will be assumed that DBMS 101 performs object level activity tracking. In addition, it will be assumed that the data structure used to keep track of the activities is a bitmap, where each individual bit corresponds to an individual object; however other embodiments may use different mapping structures.

At block 600, object-level activity tracking is enabled on a database object. In some embodiments, object-level activity tracking is enabled using any of the techniques mentioned above in "Enabling and Disabling Activity Tracking".

At block 601, DBMS 101 receives a database command that performs an activity on the database object. For database objects that contain records, the database command may be a DDL command or a DML command, depending on whether the database command reads or manipulates the records of the database object or the structure of the object itself. In other cases, such as for indexes, DML commands that manipulate records may not be applicable.

In some cases, the database command may not explicitly reference the database object. For example, indexes are structures used to improve the speed of data retrieval operations. In some cases, indexes are keyed on particular attributes of a database table. As a result, when a database command accessing the database table contains predicates, DBMS 101 determines whether any applicable indexes exist which correspond to attributes referenced by the predicates. Thus, should DBMS 101 find applicable indexes, DBMS 101 accesses those indexes in order to speed up the scan. Likewise, as the database table is modified, the indexes associated with that database table are also modified to keep the indexes up-to-date. Therefore, a database command can perform activities, such as reading and writing, to an index without explicitly referencing the index. The same issues are applicable to other database objects which are dependent on another database object, such as views. Furthermore, as a result, the same database command may perform activities on more than one database object. Thus, DBMS 101 may repeat one or more blocks of FIG. 6 for each database object affected by the database command.

At block 602, DBMS 101 determines which activities the database command received at block 601 performs. In an embodiment, DBMS 101 maintains a map between database commands and activities which is used to perform the determination above.

At block 603, DBMS 101 marks the activity in an object activity bitmap. In an embodiment, DBMS 101 maintains an object activity bitmap for each tracked activity. For example, one object activity bitmap may correspond to reads, another object activity bitmap to writes, and yet another object activity bitmap to creation. In an embodiment, each bit in the object activity bitmap corresponds to a different object and indicates whether or not the object has been the subject of the associated activity during the current period.

At block 604, DBMS 101 periodically flushes the object activity bitmap to a bitmap log. In an embodiment, each of the activity bitmaps is associated with a particular period of time, such as a calendar day, although any arbitrary period of time may be used. At the end of each day, DBMS 101 appends the activity bitmaps to the bitmap log and resets the bitmaps to their initial state. As a result, the bitmap log contains entries indicating for each day which rows have been the subject of a particular activity. In order to determine metrics, DBMS 101 mines the bitmap log. For example, in order to determine which database objects have been the subject of a read in the past ten days, DBMS 101 may retrieve from the bitmap log the last ten object activity bitmaps corresponding to reads. The ten object activity bitmaps can then be added together by performing an OR operation, which results in a bitmap where each bit indicates whether the associated database object has been read in the past ten days. In an embodiment, DBMS 101 supports a database command that allows users to query the bitmap log in order to discover metrics.

4.0 Data Classification

In an embodiment, DBMS 101 classifies the data of database 100 into one or more lifecycle states, which represent the operational relevance of each data element. For example, an "active" lifecycle state may be reserved for currently critical data, a "dormant" lifecycle state may be reserved for data that is accessed less often, and an "archived" lifecycle state may be reserved for data that is rarely accessed and should be placed in archival storage.

In some embodiments, DBMS 101 performs data classification on a per-row basis. Thus, the classifications relate to the operational relevance of individual rows. In other embodiments, DBMS 101 classifies data on a per-object basis. Thus, the classifications relate to the operational relevance of individual database objects.

In some embodiments, DBMS 101 performs data classification in response to receiving a database command instructing the DBMS 101 to enable in-database archiving. In one embodiment, the database command instructs the DBMS 101 to enable in-database archiving for database 100 globally. In another embodiment, the database command references one or more database objects for which in-database archiving is to be enabled. In still other embodiments, the database command may specify whether the in-database archiving should be performed at row-level or object-level granularity for applicable database objects.

4.1 Data Classification Storage

In some embodiments, DBMS 101 stores lifecycle state classifications in metadata. For example, DBMS 101 may utilize a map to associate particular database objects and/or rows with their corresponding lifecycle state classifications.

In another embodiment, for row-level classifications, DBMS 101 stores lifecycle state classifications as part of a database table in a lifecycle state column. FIG. 7 illustrates table 102 after in-database archiving has been enabled according to an embodiment. Thus, table 102 includes lifecycle state column 700, which can take on the value of active, dormant, or archived for each of the rows 103-111 of table 102. In an embodiment, when DBMS 101 receives a database command enabling in-database archiving for table 102, DBMS 101 generates one or more DDL commands which adds lifecycle state column to the table. In an embodiment, lifecycle state column 700 is initialized upon creation with the active lifecycle state, the lifecycle state indicating the highest degree of operational relevance.

In yet another embodiment, for row-level classifications, DBMS 101 may store lifecycle state classifications in virtual columns where the data is stored in metadata, but presented and accessed by users as though the virtual column were an actual column of table 102. Thus, in an embodiment lifecycle state column 700 is a virtual column.

4.2 Automatic Data Classification

In some embodiments, DBMS 101 automatically classifies the data of database 100 based on the metrics collected above by the activity tracking techniques. In an embodiment, each lifecycle state can be associated with a period of time during which the data was last accessed. For example, the "active" lifecycle state may be associated with data last accessed during the past month, the "dormant" lifecycle state may be associated with data last accessed one month to six months ago, and the "archived" lifecycle state may be associated with data last accessed over six months ago.

However, other embodiments may use different periods of time than the example provided above. In another embodiment, DBMS 101 also takes into account the type of activity constituting the access. For example, the "active" state may be associated with data that has received both reads and writes during a particular period, "dormant" state may be associated with data that has only received reads during the particular period, and "archived" state may be associated with data that has received neither reads or writes during the particular period.

In an embodiment, DBMS 101 scans database 100 for database objects that have in-database archiving enabled on a periodic basis, for example during downtimes when DBMS 101 is underutilized. While scanning, DBMS 101 checks the timestamps or bitmap logs generated by the activity tracking techniques, determines whether the classifications for particular database objects and/or rows should be updated based on one or more of the factors described above, and updates the classifications accordingly.

4.3 Manual Data Classification

However, in other embodiments, users submit the lifecycle state classifications for the rows and/or database objects of database 100. In many cases, users may have outside knowledge regarding the operational relevance of their data which may not available to DBMS 101. For example, some data may be critical and require access at a moment's notice, regardless of how frequently or recently the data has been accessed. Thus, users may desire fine-grained control over the lifecycle state classifications associated with their data.

A user is defined to include both human users and applications external to the DBMS 101. Thus, although this section is entitled "manual data classification", manual is intended to denote that the classifications originate from an outside source, as opposed to being automatically determined by the DBMS 101.

In an embodiment, users submit lifecycle state classifications for the rows 103-111 of table 102 by submitting DML commands which update lifecycle state column 700 with the user's own lifecycle state classifications. In another embodiment, lifecycle state column 700 may be implemented as a virtual column, thus, in response to receiving the DML commands, DBMS 101 instead updates metadata instead of an actual column of table 102. In still another embodiment, DBMS 101 may support a command which allows users to directly manipulate metadata storing the classifications for particular database objects or rows.

In some cases, users may base their classifications on the activity tracking techniques described above. Thus, in an embodiment, DBMS 101 supports commands which allow users to query the collected metrics in order to determine the proper lifecycle state classifications for their data. However, in other embodiments, DBMS 101 may not support activity tracking or the users may simply choose not to enable the activity tracking feature, relying instead upon their own judgment and background knowledge to determine lifecycle state classifications. Thus, manual lifecycle state classification may be implemented as a separate and independent feature that is not reliant upon activity tracking.

4.4 Row-Level Visibility Controls

In many cases, users are only interested in data with a particular degree of operational relevance (for example, rows with the active lifecycle state). In an embodiment, DBMS 101 maintains a session level parameter that controls which lifecycle states are visible to the users of database 100 when executing DML commands. In addition, DBMS 101 supports a command that allows users to set the session level parameter.

Thus, in an embodiment, when the session level parameter indicates that particular lifecycle states are visible, DBMS 101 automatically rewrites DML commands to include a predicate limiting application of the DML commands to rows with visible lifecycle states. For example, the session level parameter may be set by default such that only rows with the active lifecycle state are visible. Thus, when users query table 102, DBMS 101 automatically rewrites the query to add a predicate limiting the results to rows where the lifecycle state column 700 indicates an active state. As a result, users are presented with the illusion of working on a smaller set of active data, without removing data with lesser operational relevance from database 100. Furthermore, in many cases, rows with the active lifecycle state represent only a small fraction of the data stored on database 100. Thus, by pruning away data with lesser operational relevance joins can be performed more efficiently since query optimization techniques can take advantage of the reduction in cardinality provided by the additional predicate.

However, should data with lesser operational relevance, such as data in the dormant or archived state, be required a user may submit a command instructing DBMS 101 to set the session level parameter such that a different set of lifecycle states are visible. As a result, users are able to seamlessly transition from working on the set of active data, to working on dormant and/or archived data, without the need to remove and restore data from database 100.

In some embodiments, application upgrades can be improved by utilizing the visibility controls to separate active, dormant, and archived data. For example, when applications perform updates to enable new features, applications can prioritize updating active rows over dormant or archived rows by setting the session level parameter accordingly. As a result, the new features can be made available to the users for active rows immediately, with updates to dormant and archived rows being deferred in later phases.

5.0 In-Database Archiving

In some embodiments, DBMS 101 moves rows and/or database objects to storage tiers based on the lifecycle state classifications. In an embodiment, each storage tier denotes a particular balance between access speed and storage cost. As one example, each storage tier may represent a different type or quality of storage medium. In general, as the access speed of a storage medium increases the price to purchase that storage medium tends to increase as well. As a result, many businesses have a limited amount of premium storage space with the fastest access speed and a much larger amount of secondary or tertiary storage space which is slower, but cheaper to purchase in bulk. Thus, in order to maximize the performance of DBMS 101, data with higher operational relevance can be placed on faster storage mediums, such as top-quality disk drives, while data with lesser operational relevance can be placed on slower storage mediums, such as optical disks or tape drives. As another example, each storage tier may represent a storage area where the data is compressed using a different technique. Similar to the choice of storage medium, each compression technique also represents a tradeoff, in this case between access speed and storage space. More specifically, compression techniques that achieve higher compression ratios also tend to take longer to decompress when accessing the data. Thus, in order to maximize the performance of DBMS 101, data with higher operational relevance can be stored uncompressed to allow faster access, while data with lower operational relevance can be compressed to save space. In other embodiments, a storage tier may represent a combination of both storage medium and the technique used to compress data on the storage medium.

In an embodiment, DBMS 101 associates each lifecycle state with a particular storage tier. Thus, DBMS 101 may store in metadata a map indicating for each lifecycle state, the storage medium and/or compression technique used to store data associated with that lifecycle state.

In some cases, compression techniques may have different access speeds depending on the type of activity being performed on the database element. For example, some compression techniques allow quick access to database elements during a read, but require more time to perform writes. Thus, in embodiments which differentiate lifecycle state depending on the type of activity, the lifecycle states may also be associated with the storage tiers which best perform those activities. For example, the active lifecycle state may be associated with database elements which frequently receive reads and writes, the dormant lifecycle state may be associated with database elements which frequently receive reads but not writes, and the archived lifecycle state may be associated with database elements which do not frequently receive either reads or writes. Thus, rows with the active lifecycle state may remain uncompressed, rows with the dormant lifecycle state may be compressed with techniques that optimize reads, and rows with archived lifecycle states may be compressed with techniques that provide the best compression ratios.

In an embodiment, DBMS 101 in response to classifying a database element or determining that a lifecycle state classification for a database element has been modified automatically moves the database element to the storage tier associated with the classified lifecycle state. As mentioned above, classifications may occur automatically or as the result of manual user input. In the process of moving the database element, DBMS 101 stores the data element in the storage medium associated with the storage tier and/or compresses the data element using the compression technique associated with that storage tier. In one embodiment, DBMS 101 moves database elements as each data element is classified. However, in another embodiment, DBMS 101 may move database elements to storage tiers in batches. As one example, DBMS 101 may wait until a threshold number of database elements need to be moved to a particular storage tier, then in response to the threshold being reached performs the move. As another example, DBMS 101 may periodically move database elements to their respective storage tiers at a specified period of time, such as during scheduled maintenance downtimes.

In an embodiment, DBMS 101 maintains an index indicating the storage medium and compression technique used to store the database elements of database 100 along with addresses indicating where the database elements can be located within their respective storage mediums. Thus, as database elements are placed in a storage tier, or moved from one storage tier to another, the index is updated. Then, when DBMS 101 requires access to a particular database element, DBMS 101 can use the index to locate where the database element is stored and/or the decompression technique required to access the database element.

In one embodiment, DBMS 101 stores database elements in a flexible and extensible structure, called a compression unit, described by application Ser. No. 12/617,669, "Structure of Hierarchical Compressed Data Structure for Tabular Data", naming Ganesh et al. as inventors, the entire contents of which is hereby incorporated by reference for all purposes as if fully stated herein. The compression units described by application Ser. No. 12/617,669 serve as one example of a structure that can be used by the DBMS 101 to maintain data within the same database that has been compressed using different techniques.

6.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
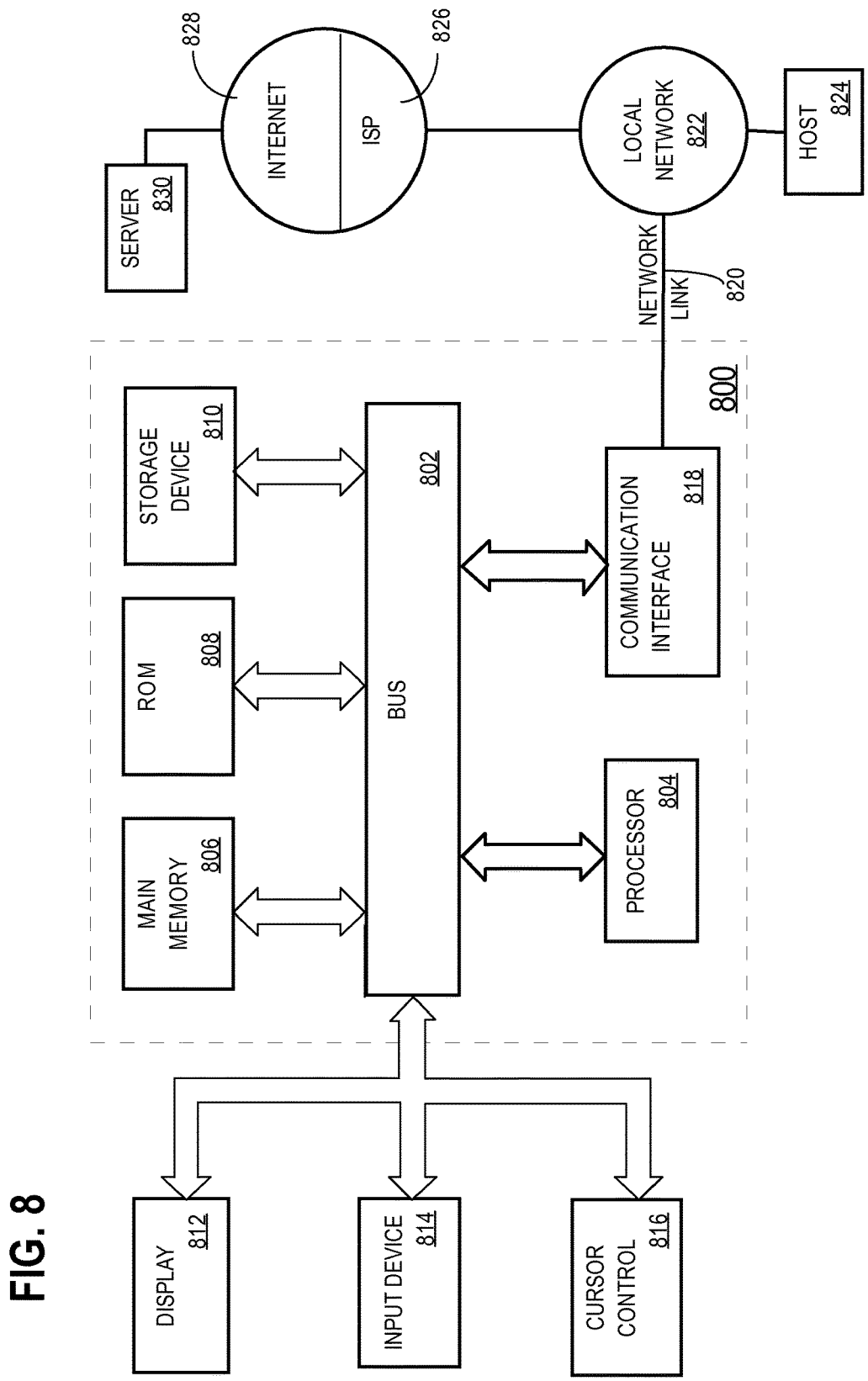
FIG. 8 is a block diagram that illustrates a computer system upon which an embodiment of the invention may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:
1. A method comprising:
a database management system (DBMS) adding one or more activity columns to a database table, wherein each of the one or more activity columns is associated with a particular activity of a set of activities, wherein the one or more activity columns include at least one activity column associated with reads;
the DBMS, in response to receiving a database command that accesses one or more rows of the database table, determining one or more activities that the database command performs, wherein at least one activity of the one or more activities performs a read;
the DBMS storing activity information for each of the one or more rows in metadata that is external to tables of the DBMS;
flushing the activity information from the metadata to the database table, including the DBMS updating an activity column of the one or more activity columns based on the activity information for each of the one or more rows stored in the metadata, when: a) the database command is not read-only, or b) a specified duration has elapsed since the activity information was last flushed and the database command is read-only;
wherein the method is performed by one or more computing devices.

2. The method of claim 1, wherein:
storing the activity information is performed by the DBMS marking the one or more rows in one or more bitmaps corresponding to the one or more activities and
updating the activity column is performed in response to a determination that a specified period of time has elapsed, and involves updating the activity column based on the one or more bitmaps.

3. The method of claim 1, wherein updating the activity column is performed by rewriting the database command to include writing the activity information for each of the one or more rows to the activity column.

4. The method of claim 1, wherein updating the activity column is performed by generating one or more additional database commands that write the activity information for each of the one or more rows to the activity column.

5. The method of claim 1, wherein the activity column is a protected column that users are prevented from updating directly.

6. The method of claim 1, wherein the activity information includes at least one of a time stamp or a frequency count.

7. The method of claim 1, wherein adding the one or more activity columns to the database table occurs in response to receiving a database command requesting to enable an activity tracking feature for the database table.

8. The method of claim 1, wherein the database command contains a set of predicates and the one or more rows match the set of predicates.

9. The method of claim 1, wherein the one or more activity columns include at least one of an activity column associated with updates or an activity column associated with inserts.

10. A non-transitory computer-readable medium storing instructions, which when executed by one or more processors, cause:
a database management system (DBMS) adding one or more activity columns to a database table, wherein each of the one or more activity columns is associated with a particular activity of a set of activities, wherein the one or more activity columns include at least one activity column associated with reads;
the DBMS, in response to receiving a database command that accesses one or more rows of the database table, determining one or more activities that the database command performs, wherein at least one activity of the one or more activities performs a read;
the DBMS storing activity information for each of the one or more rows in metadata that is external to tables of the DBMS;
flushing the activity information from the metadata to the database table, including the DBMS updating an activity column of the one or more activity columns based on the activity information for each of the one or more rows stored in the metadata, when: a) the database command is not read-only, or b) a specified duration has elapsed since the activity information was last flushed and the database command is read-only.

11. The non-transitory computer-readable medium of claim 10, wherein:
storing the activity information is performed by the DBMS marking the one or more rows in one or more bitmaps corresponding to the one or more activities and
updating the activity column is performed in response to a determination that a specified period of time has elapsed, and involves updating the activity column based on the one or more bitmaps.

12. The non-transitory computer-readable medium of claim 10, wherein updating the activity column is performed by rewriting the database command to include writing the activity information for each of the one or more rows to the activity column.

13. The non-transitory computer-readable medium of claim 10, wherein updating the activity column is performed by generating one or more additional database commands that write the activity information for each of the one or more rows to the activity column.

14. The non-transitory computer-readable medium of claim 10, wherein the activity column is a protected column that users are prevented from updating directly.

15. The non-transitory computer-readable medium of claim 10, wherein the activity information includes at least one of a time stamp or a frequency count.

16. The non-transitory computer-readable medium of claim 10, wherein adding the one or more activity columns to the database table occurs in response to receiving a database command requesting to enable an activity tracking feature for the database table.

17. The non-transitory computer-readable medium of claim 10, wherein the database command contains a set of predicates and the one or more rows match the set of predicates.

18. The non-transitory computer-readable medium of claim 10, wherein the one or more activity columns include at least one of an activity column associated with updates or an activity column associated with inserts.

* * * * *